United States Patent Office 2,982,581
Patented May 2, 1961

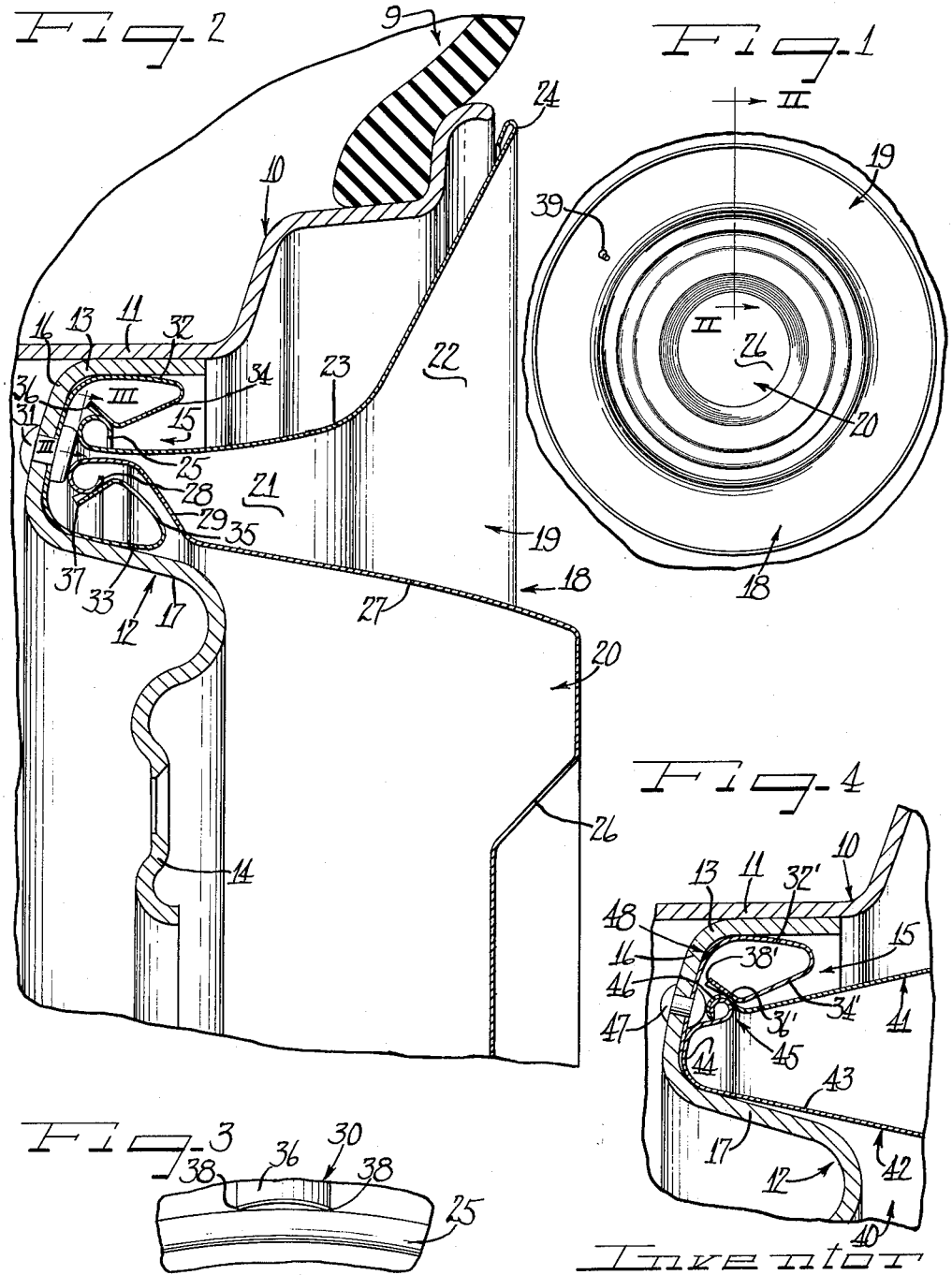

2,982,581
WHEEL COVER
George Albert Lyon, 13881 W. Chicago Blvd., Detroit, Mich.
Filed June 28, 1955, Ser. No. 518,525
15 Claims. (Cl. 301—37)

This invention relates to automobile wheel covers and more particularly to a cover with improved retaining means.

At the present time, automobile manufacturers are attempting to outdo each other in the provision of outstanding and highly ornamental designs for the automobile. In fact, more and more emphasis is being placed on the wheel. Today the present trend is to employ wheel covers which have exceptionally deep draws so as to give a highly ornamental and different look to the wheel.

The instant cover construction embodies a highly ornamental deep draw and massive type cover, and as a consequence thereof, new retaining means had to be developed in order that this new cover construction could be mounted on the wheel.

It is an object of this invention to provide a wheel cover with improved means which will properly hold the cover on the wheel notwithstanding the depth of draw of the cover.

Still another object of this invention is to provide a cover wherein the retaining means may be economically manufactured and wherein the retaining means also serves to center the cover on the wheel.

Yet another object of this invention is to provide an improved wheel cover which lends itself to economical manufacture on a large production basis and which affords an entirely different ornamental look to the wheel.

A further object of this invention is to provide a novel multi-part cover construction which parts may be either fastened on the wheel individually or joined together and fastened on the wheel.

Other objects and features of this invention will more fully appear from the following detailed description taken in connection with the accompanying drawing which illustrates several embodiments thereof and in which:

Figure 1 is a fragmentary side view of a wheel embodying the cover with the features of this invention;

Figure 2 is an enlarged fragmentary cross sectional view taken on substantially line II—II of Figure 1 looking in the direction indicated by the arrows;

Figure 3 is a fragmentary detailed view taken on line III—III of Figure 2 looking in the direction indicated by the arrows; and Figure 4 is an enlarged fragmentary cross sectional view similar to that shown in Figure 2 but showing a modified form of my invention.

The reference character 9 designates generally a pneumatic tire assembly mounted in a customary way upon a multi-flanged drop center type of tire rim 10 which includes a base flange 11. This tire rim 10 is of a conventional construction and is suitably secured upon and carried upon a central body part or spider 12 which includes an attachment flange 13; the base flange and attachment flange being secured together.

The spider 11 as is customary has a central bolt on flange 14 by means of which the wheel may be detachably fastened to a part on the axle of the automobile.

As is known, the tire rim 10 comprises a rolled metallic part whereas the spider or body part 12 comprises a metallic stamping.

The body part in keeping with the features of this invention is provided with an annular deeply axially inset depression or dished body area 15 adjacent the junction of the body and rim parts 10 and 12; the depression 15 being defined by a series of depression flanges including the annular axial attachment flange or radially facing circular body part portion 13, a radially annular flange 16 connected at the axially inner end of the attachment flange 13, an annular axial flange or radially facing circular body part portion 17 connected at its inner end to the radially inner end of the radial flange 16.

Cooperable with this wheel assembly, is a wheel cover assembly designated generally by the reference numeral 18. The cover 18 includes a ring member 19 and a circular cover member 20 which when assembled together on the wheel define a dished cover area or deep draw. This wheel cover may be made from any suitable metallic sheet material although excellent results may be attained by making it from stainless sheet by virtue of the fact that such material lends itself to highly desirable finishes.

The outer annular member 19 includes diverging radially and axially inner and radially and axially outer portions 21 and 22 which are joined at the reinforcing rib 23; the portion 21 comprising inwardly directed flange structure. The outer end of the member 19 includes an annular finishing or pry-off bead 24 while the inner end of the member 19 has an annular retaining bead or bead-like formation or shoulder area 25. The member 19 is adapted to overlie the junction of the wheel parts and the tire rim thereby creating a massive appearance.

The inner annular member 20 includes a relatively large central crown area 26 which is joined to a deeply axially inwardly annular side wall or inwardly directed flange structure 27 terminating in a retaining bead or bead-like formation or shoulder area 28. Provided intermediately on the side wall 27 is an offset area 29 which is defined by a radially outwardly and axially inwardly extending portion which is angled in close proximity to the deeply axially inset diverging confronting portion 21 of the outer member 19 thereby creating a deep draw effect.

Carried within the annular depression 15 are a plurality of circumferentially spaced resilient cover retaining clips 30 which are each so positioned and so constructed as to be capable of having a portion thereof backed up and reinforced by the walls defining the depression 15. The clip 30 as shown in Figure 2 is of a C-shaped or dished configuration and is nested within the depression 15 being suitably secured to the radial flange 16 by a rivet 31.

Secured to each of the axially outwardly extending portions 32 and 33 of the clip generally axially inwardly resilient lead-in or camming portions or legs 34 and 35 which are terminated in an angled shouldered extremity or leg or distal end portions 36 and 37. The legs 34 and 36 and the legs 35 and 37 of the clips define resiliently deflectable clip areas. The portions 32, 34, 36 and 33, 35, 37 are each of a looped or goose neck configuration.

Each of the extremities 36 and 37, as is best seen in Figure 3, are of an arcuate or channeled configuration. It will be appreciated that by virtue of forming the extremities 36 and 37 of an arcuate configuration that means may be provided for insuring co-rotation of the wheel and cover with a minimum of slippage. In other words gripping edges or turn preventing elements 38—38

(Figure 3) are provided on each of the extremities 36 and 37 which are capable of biting into the cover bead in retaining engagement.

In mounting the cover on the wheel, cover members 19 and 20 may be interchangeably axially aligned with respect to the depression 15 and urged inwardly with the valve 39 projecting through the cover. The reason why the cover members may be interchangeably mounted on the wheel is that when they are mounted on the wheel there is at all times a slight radial space or gap between the beads 25 and 28. The beads 25 and 28 are of normally slightly larger and smaller respective diameters than that of the angled shouldered clip extremities 36 and 37 so that resilient tensioned engagement may be obtained when they are engaged together. In assembly it will be noted that the rivet 31 is so constructed and positioned as to be capable of providing a back up for the beads 25 and 28 in order to minimize the possibility of displacement. When the cover members 19 and 20 are in assembly on the wheel the beads 25 and 28 are disposed axially inwardly of the bolt-on flange 14 thereby allowing a relatively deep depression to be defined between the cover members and which opens axially outwardly so that light may be reflected therein to produce a highly ornamental and attractive flashy type cover construction.

In order to remove the cover members 19 and 20 from the wheel a suitable pry-off tool may be employed to pry them out of retained engagement with the clips.

Thus, it is in the foregoing manner that improved retaining means is provided for a cover of a deep draw construction. The cover members each have confronting cover portions and are each extended relatively deeply axially into the depression to define a deep draw.

The modification shown in Figure 4 is of a similar construction as to that shown in Figures 1–3 and similar numbers have been used wherever possible.

Adapted to be mounted on the spider 17 and the depression 15 is a one-piece cover 40. The cover 40 includes cover portions 41 and 42 together comprising inwardly directed flange structure or a circular cover portion. The cover portion or annular side wall 41 is generally radially and axially inwardly inclined while the cover portion 42 includes a radially outwardly and axially inwardly inclined portion 43 which is disposed in converging relation with respect to the portion 41. The portion 43 has a generally radially outwardly and then radially and axially outwardly extending portion 44 disposed at its axially inner end. The portions 41 and 42 are joined or lock seamed together at 45 to define an angled annular offset beaded projection 46.

Secured to body part flange 16 by rivets 47 are bottom or base portions of a plurality of circumferentially spaced resilient cover retaining clips 48. The clips 48 correspond generally to a fragment of the clip 30 shown in the first embodiment represented by numerals 32, 34, 36 and edges 38 and accordingly function in the same manner as does that portion of the clip 48. Primed numerals 32', 34', 36' and 38' have been used in Figure 4 to identify corresponding portions.

In assembling the cover 40 on the wheel, the cover 40 is aligned with the depression 15 and urged axially inwardly with the bead 46 serving to deflect the lead-in-portion or leg 34' until it snaps behind the angled shouldered portion or leg 36'.

It will be here noted that not only is the bead 46 backed up by the rivets 47, but in addition, it is backed up by the bottomed engagement effected between flanges 16 and 17 defining the depression and the cover portions 43 and 44. Thus in this embodiment the cover is directly bottomed against the flanges defining the depression 15 and in this manner an additional back up is provided while at the same time permitting a highly desirable deep draw cover construction.

Removal of the cover may be brought about by the insertion of a suitable pry off tool under the cover and then twisting the pry off tool in such a fashion as to pry the cover out of engagement with the wheel.

It will be understood that modification and variations may be effected without departing from the spirit and scope of the novel concepts of the present invention.

I claim:

1. In a wheel structure including a wheel having a tire rim part and a body part with an inset annular depression adjacent the junction of the parts having resilient clip means therein including radially spaced distal end portions, a wheel cover for disposition at the outer side of the wheel including inner and outer cover members each including relatively deeply axially inwardly extending portions and each having an extremity engageable independently of one another in snap-on pry-off engagement with the radially spaced distal end portions of the resilient clip means and with said axially inwardly extending portions being radially spaced when in assembly on the wheel.

2. In a wheel structure including a wheel having a tire rim part and a body part with an inset annular depression adjacent the junction of the parts having resilient clip means therein including radially spaced distal end portions, a wheel cover for disposition at the outer side of the wheel including inner and outer cover members each including relatively deeply axially inwardly extending portions and each having an extremity engageable independently of one another in snap-on pry-off engagement with the radially spaced distal end portions of the resilient clip means and with said axially inwardly extending portions being radially spaced when in assembly on the wheel, said extremity comprising a relatively stiff annular bead.

3. In a wheel structure including a wheel having a tire rim part and a body part with an annular depression adjacent the junction of the parts having resilient clip means therein comprising clips, a wheel cover for disposition at the outer side of the wheel including inner and outer cover members each including relatively deeply axially inwardly extending portions and each having an extremity engageable independently of one another in snap-on pry-off engagement with the resilient clip means and with said axially inwardly extending portions being radially spaced when in assembly with the wheel, and circumferentially spaced edges on each of said clips coacting with each of said extremities in order to insure co-rotation of same with the wheel when mounted thereon.

4. In a wheel structure including a wheel having a tire rim part and a body part with an inset annular depression adjacent the junction of the parts carrying a plurality of circumferentially spaced resilient shouldered clips therein each having a deflectable distal end portion provided with circumferentially spaced edges, a wheel cover for disposition at the outer side of the wheel including a relatively deeply axially inwardly extending drawn cover marginal portion provided with an offset terminal comprising an annular bead, said drawn portion extending into the inset depression in snap-on pry-off cover retaining engagement behind the spaced edges on the circumferentially spaced resilient shouldered clips, said edges extending generally radially toward said wheel cover for edgewise cover retaining engagement therewith.

5. In a wheel structure including a cover for disposition on the outer side of the wheel including inner and outer annular cover members each having relatively deeply axially inwardly inset terminal portions, a wheel having rim and body parts including a relatively deeply axially inset annular depression, a plurality of circumferentially spaced resilient cover retaining clips carried in said depression each including a generally C-shaped portion having shouldered terminal portions behind which the inset terminal portions of the cover members are capable of engaging an assembled relationship, said clips having turned edges for edgewise engagement with said terminal portions for insuring co-rotation of the wheel with the cover when the cover is mounted thereon.

6. In a wheel structure including a cover for disposition on the outer side of the wheel having a deeply inset axial draw portion provided with an offset portion, a wheel having rim and body parts including a relatively deeply axially inset annular depression, a plurality of circumferentially spaced resilient cover retaining clips carried in the depression including a shouldered terminal portion behind which the offset portion is capable of being engaged in snap-on pry-off relation when mounted on the wheel, said clips having the shouldered terminal turned providing edges for edgewise engagement against said offset portion for insuring co-rotation of the wheel with the cover when the cover is mounted thereon.

7. In a wheel structure including a wheel body and a tire rim and with the wheel body provided with an annular grooved area defining an annular wheel groove at the junction of the wheel body with the tire rim, a cover assembly for disposition on the outer side of the wheel having axially inwardly directed flange structure, a series of retaining clips carried by the wheel body and retainingly engageable with said flange structure, said clips having edges thereon bitingly engageable with said flange structure to hold the cover assembly against turning on the wheel, said flange structure comprising a bead-like formation and with the bead-like formation being retainingly seated in the annular wheel groove when in engagement with said retaining clips.

8. In a wheel structure including a wheel body and a tire rim, a cover assembly for disposition on the outer side of the wheel including a ring member and a circular centrally disposed cover member, the ring and cover members each having axially inwardly directed flange structure, a series of retaining clips carried by the wheel body and retainingly engageable with said flange structures, said clips having radially spaced clip edges thereon bitingly engageable with said flange structures to hold the cover and ring members against turning on the wheel and in radially spaced relation relative to one another, said flange structures each comprising a bead-like formation and with said bead-like formations being retainingly seated axially behind the clip edges when in retained engagement with said retaining clips.

9. In a wheel structure including a wheel body and a tire rim, a cover assembly for disposition on the outer side of the wheel including a ring member and a circular centrally disposed cover member, the ring and cover members each having axially inwardly directed flange structure, a series of retaining clips carried by the wheel body and retainingly engageable with said flange structures, said clips having radially spaced clip edges thereon bitingly engageable with said flange structures to hold the cover and ring members against turning on the wheel and in radially spaced relation relative to one another, said flange structures each comprising a bead-like formation and with said bead-like formations being retainingly seated axially behind the clip edges when in retained engagement with said retaining clips, each of the clips being generally C-shaped and having the opposite ends of the C provided with said radially spaced clip edges and with the bead-like formations on said cover and ring members telescoped axially between and behind said radially spaced clip edges into retained engagement and assembly therewith.

10. In a wheel structure including rim and body parts with an annular grooved area defining a body part groove disposed inwardly of the junction of the parts and with the annular grooved area having a generally radially facing circular body part portion, a cover for disposition over the outer side of the wheel including a circular cover area for overlying the body part portion and having a generally axially inwardly extending circular cover portion extended into the grooved area and dimensioned for substantially telescoping disposition relative to said body part portion, and a series of turn-preventing type of clip elements carried by and projecting resiliently generally radially and axially into the grooved area for sustaining the cover on the wheel, each of said elements having a distal end portion of substantial width providing a generally radially directed face for thrusting toward said circular cover portion and having a longitudinal biting edge directed generally radially for biting into said circular cover portion under the resilient thrust of said distal end portion and for thereby holding the cover against turning on the wheel.

11. In a wheel structure, a wheel having rim and body parts including an inset annular depression provided with an axially outwardly facing radially extending depression flange, a plurality of circumferentially spaced resilient cover retaining clips carried in the depression each including a generally C-shaped portion with the bottom of the C bottomed against the depression flange and with the C-shaped portion having radially inner and outer shouldered terminal portions disposed axially outwardly of the bottom of the C on opposite ends of the C-shaped portion, a cover assembly for overlying disposition on the wheel including inner and outer annular cover members each having terminal portions, the terminal portion of the inner cover member being held in assembly on the wheel by the radially inner shouldered terminal portions and the terminal portion of the outer cover member being held in assembly on the wheel by the radially outer shouldered terminal portions.

12. In a wheel structure, a wheel including joined rim and body parts with the body part having an annular dished body part area, the bottom of which is disposed axially inwardly of the bolt-on body part area, circumferentially spaced clips secured in said annular dished body part area each having radially inner and outer resiliently deflectable clip areas disposed axially inwardly of the bolt-on body part area on radially opposite sides of the dished body part area for retaining cooperation with a cover structure, a cover structure comprising a ring member and a circular cover member each having an axially inner end disposed axially inwardly of the bolt-on body part area, said ring and cover members each provided with a clip engaging shoulder area, the circular cover member having its clip engaging shoulder area engaged with the radially inner resiliently deflectable clip areas to sustain it upon the wheel, and the ring member having its clip engaging shoulder area engaged with the radially outer resiliently deflectable clip areas to sustain it in assembly with the wheel.

13. In a wheel structure, a wheel including joined rim and body parts with the body parts having an annular dished body part area, the bottom of which is disposed axially inwardly of the bolt-on body part area, circumferentially spaced clips secured in said annular dished body part area each having a resiliently deflectable cover engaging clip area disposed axially inwardly of the bolt-on body part area for retaining cooperation with a cover structure, a cover structure having an annular dished cover area and with the axially innermost end of the dished area of the cover structure disposed axially inwardly of the bolt-on body part area, said dished cover area provided with a shoulder area adapted to deflect the resiliently deflectable clip area for cover retaining cooperation therewith, the resiliently deflectable clip area which is engaged with the shoulder area on the cover being disposed axially inwardly of the bolt-on body part area thus enabling the dished cover area of the cover structure to extend deeply into the wheel, the clips and side wall portions of the annular dished body part area coacting together and with the cover structure to sustain the cover structure in retained assembly with the wheel and against radial movement in the annular dished body part area as well as against axial movement out of the annular dished body part area.

14. In a wheel structure, a wheel including joined rim and body parts with the body part having an annular dished body part area, circumferentially spaced clips secured to the wheel and disposed in said annular dished body part area each having radially inner and outer resiliently deflectable clip areas disposed on radially opposite sides of the dished body part area for retaining cooperation with a cover structure, a cover structure comprising a ring member and a circular cover member each having a generally axially inner end disposed in the dished body part area, and with said ring and cover members each provided with a clip engaging shoulder area, the circular cover member having its clip engaging shoulder area engaged with the radially inner resiliently deflectable clip area to sustain it upon the wheel, and the ring member having its clip engaging shoulder area engaged with the radially outer resiliently deflectable clip area to sustain it in assembly with the wheel.

15. In a wheel structure, a wheel including rim and body parts with an axially inset annular grooved area disposed generally at the junction of the parts, a cover having radially spaced axially inwardly directed flange portions disposed in the axially inset annular grooved area, and circumferentially spaced resiliently deflectable clips disposed between the grooved area and the radially spaced axially inwardly directed flange portions and with the clips and side wall portions of the grooved area co-acting together and with the cover thereby sustaining the cover in retained assembly with the wheel and against radial movement in the grooved area as well as against axial movement out of the grooved area.

References Cited in the file of this patent
UNITED STATES PATENTS

| | | |
|---|---|---|
| 1,523,285 | Pritchett | Jan. 13, 1925 |
| 2,108,398 | Allen | Feb. 15, 1938 |
| 2,216,219 | Wiley | Oct. 1, 1940 |
| 2,239,366 | Lyon | Apr. 22, 1941 |
| 2,239,367 | Lyon | Apr. 22, 1941 |
| 2,368,236 | Lyon | Jan. 30, 1945 |
| 2,443,625 | Lyon | June 22, 1948 |
| 2,447,516 | Lyon | Aug. 24, 1948 |
| 2,609,245 | Lyon | Sept. 2, 1952 |
| 2,704,687 | Adell | Mar. 22, 1955 |